US012710746B2

(12) United States Patent
Yuldashev et al.

(10) Patent No.: US 12,710,746 B2
(45) Date of Patent: Aug. 18, 2026

(54) INTEGRATION FOR LOCAL MANUFACTURING OF DENTAL PRODUCTS

(71) Applicant: 3SHAPE A/S, Copenhagen K (DK)

(72) Inventors: Marat Yuldashev, Copenhagen K (DK); Andreea Nicoleta Stefan, Copenhagen K (DK); Alexandr Iotko, Copenhagen K (DK)

(73) Assignee: 3Shape A/S, Kobenhavn K (DK)

( * ) Notice: Subject to any disclaimer, the term of this patent is extended or adjusted under 35 U.S.C. 154(b) by 337 days.

(21) Appl. No.: 18/602,531

(22) Filed: Mar. 12, 2024

(65) Prior Publication Data

US 2024/0310818 A1 Sep. 19, 2024

Related U.S. Application Data

(60) Provisional application No. 63/489,941, filed on Mar. 13, 2023.

(51) Int. Cl.

| | |
|---|---|
| ***G05B 19/418*** | (2006.01) |
| ***A61C 9/00*** | (2006.01) |
| ***A61C 13/00*** | (2006.01) |
| ***B33Y 50/00*** | (2015.01) |

(52) U.S. Cl.

CPC ........ *G05B 19/4188* (2013.01); *A61C 9/0053* (2013.01); *A61C 13/0004* (2013.01); *A61C 13/0019* (2013.01); *B33Y 50/00* (2014.12); *G05B 19/4183* (2013.01)

(58) Field of Classification Search

CPC ............ G05B 19/4188; G05B 19/4183; A61C 9/0053; A61C 13/0004; A61C 13/0019; A61C 13/0006; B33Y 50/00

See application file for complete search history.

(56) References Cited

U.S. PATENT DOCUMENTS

| | | | | |
|---|---|---|---|---|
| 11,076,146 B1 | 7/2021 | Fisker et al. | | |
| 12,465,469 B2 * | 11/2025 | Lee | .................... | A61C 13/0004 |
| 2015/0277811 A1 * | 10/2015 | Lee | ....................... | B29C 64/386 358/1.15 |
| 2016/0374784 A1 * | 12/2016 | Joshi | ................. | A61C 13/0013 433/214 |

(Continued)

FOREIGN PATENT DOCUMENTS

| | | |
|---|---|---|
| WO | 0216867 A1 | 2/2002 |
| WO | 2010048960 A1 | 5/2010 |

(Continued)

*Primary Examiner* — Eric J Yoon

(74) *Attorney, Agent, or Firm* — BUCHANAN INGERSOLL & ROONEY PC

(57) ABSTRACT

A method for manufacturing a dental component in a dental clinic or laboratory, the method including setting up one or more manufacturing machines for usage by a clinical computer over a computer network; designing, in a design software application on the clinical computer, the dental component to be manufactured; receiving, on the clinical computer, a status message from the one or more manufacturing machines indicating a status of the manufacturing machine(s); responsive to the status message(s), selecting a manufacturing machine for manufacturing the dental component; and sending the designed dental component from the clinical computer to the selected manufacturing machine over the computer network.

7 Claims, 9 Drawing Sheets

(56) References Cited

U.S. PATENT DOCUMENTS

| | | | | |
|---|---|---|---|---|
| 2023/0277283 | A1* | 9/2023 | Piché | G06N 3/045<br>433/223 |
| 2024/0403131 | A1* | 12/2024 | Eker | H04L 41/16 |
| 2025/0365268 | A1* | 11/2025 | Thakur | H04L 9/3268 |

FOREIGN PATENT DOCUMENTS

| | | | |
|---|---|---|---|
| WO | 2010145669 | A1 | 12/2010 |
| WO | 2012083967 | A1 | 6/2012 |
| WO | 2012168322 | A2 | 12/2012 |
| WO | 2013010910 | A1 | 1/2013 |
| WO | 2013132091 | A1 | 9/2013 |
| WO | 2014000745 | A1 | 1/2014 |
| WO | 2014125037 | A1 | 8/2014 |
| WO | 2018172257 | A1 | 9/2018 |
| WO | 2020148041 | A1 | 7/2020 |

* cited by examiner

INTEGRATION FOR LOCAL MANUFACTURING OF DENTAL PRODUCTS

TECHNICAL FIELD

The present disclosure relates to methods, systems, and computer program products that integrate design functionality and manufacturing functionality, so as to allow for the local manufacture of a dental product at a dental clinic or dental laboratory.

BACKGROUND

Dental clinics typically send the designs for dental products to external laboratories for the manufacture of the dental product. These remote laboratories will then manufacture the dental product and ship the completed product to the dental clinic or the patient. This existing method is time-consuming and costly. It can also lead to errors in production and extensive communication. While remote dental laboratories will still be required for certain dental products, an increasing number of dental products may be manufactured locally.

Some clinics have begun producing some dental products in house. For example, the dental clinic may use a manufacturing machine, such as a 3D printer and/or milling machine, for certain dental products. However, different manufacturing machines use different software, use different file formats, use different materials, and have other complications. Some manufacturing machines require direct connection to the clinical computer, which can complicate the process for multiple clinical computers utilizing the same manufacturing machine.

SUMMARY

Embodiments of the invention solve the above-mentioned problems by providing an integration of design functionality and manufacturing functionality for the local manufacture of dental products. Local manufacturing allows for rapid help to the patient, easy adjustments to existing dental products, reduced cost, and other benefits. A clinical computer will interact with a manufacturing machine that is local to the clinical computer, over a computer network. A manufacturing machine may include a milling machine, a 3D printer, or other type of manufacturing machine. This interaction allows any of numerous clinical computers on a computer network to use the manufacturing machine. It also allows for a single clinical computer to interact with any of numerous different manufacturing machines, based upon the needs of the dental product to be produced.

A first embodiment of the invention is broadly directed to a system for manufacturing a dental component in a clinical setting. The system includes a manufacturing machine and a clinical computing device. The manufacturing machine is configured to manufacture the dental component. The clinical computing device is communicatively coupled to the manufacturing machine over a computer network. The the clinical computing device is configured to receive a status message from the manufacturing machine indicative of a status of the manufacturing machine; receive a selection of a manufacturing machine for a dental design completed via an application of the clinical computing device; display, in the application, an indication of the status message; send, from the application, instructions to the manufacturing machine indicative of the dental design; receive a manufacturing status message indicative of the progress of the manufacturing of the dental component; and display, in the application, an indication of the manufacturing status message.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in, nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

DETAILED DESCRIPTION

Figure 1A:
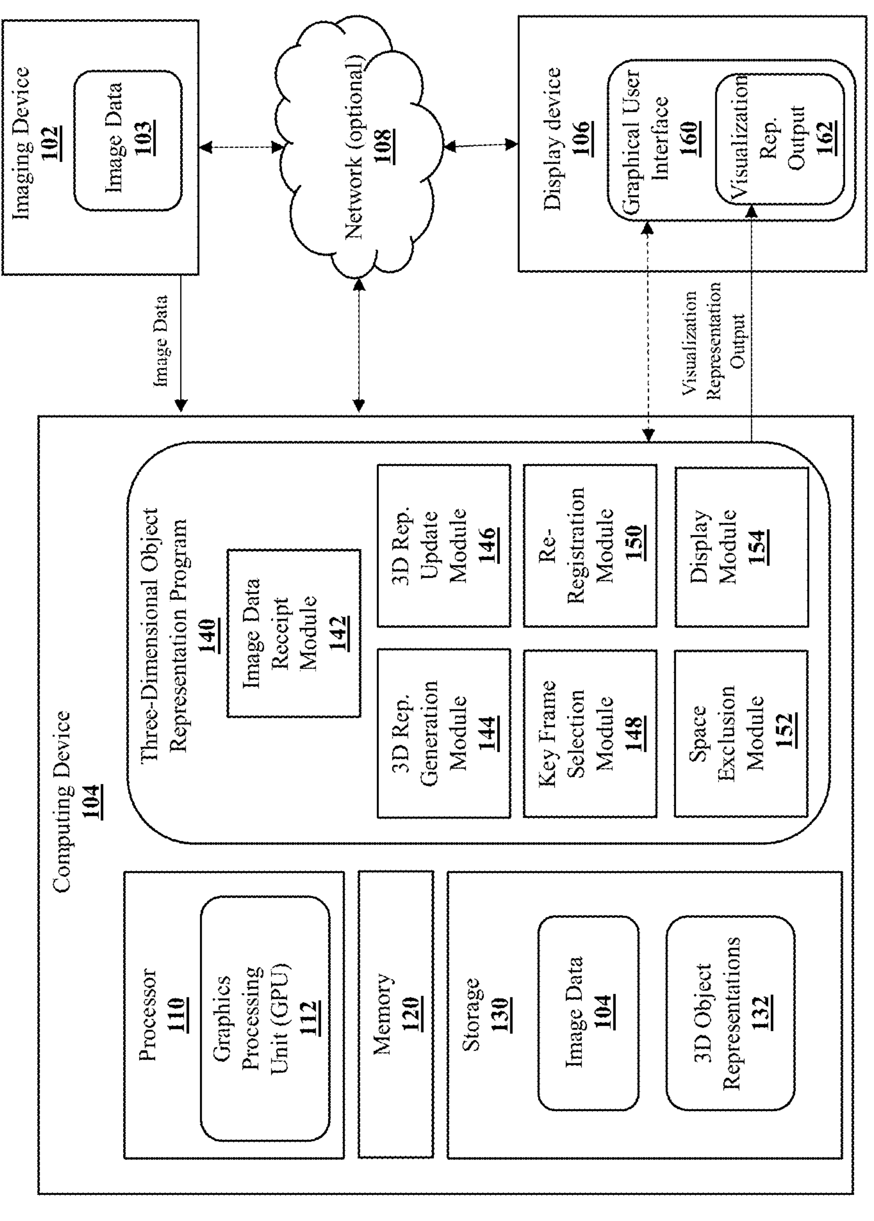
FIG. 1A illustrates a clinical computer setup that may be used in accordance with some embodiments of the invention.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. For instance, the drawing figures do not limit the present invention to the specific embodiments disclosed and described herein. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference. Use of directional terms such as "upper," "lower,", "top", "bottom", "above," "below", "front", "forward", "left" or "right", and etc. are intended merely for orientation, to describe the positions and/or orientations of various components to one another, and are not intended to impose limitations on any position and/or orientation of any embodiment of the invention relative to any reference point external to the reference.

System Overview for Generating a Digital Three-Dimensional Representation of a Dental Object during Scanning with a Dental Imaging Device FIG. 1A illustrates system 100 for generating a digital three-dimensional representation of a dental object during scanning with a dental imaging device in accordance with exemplary embodiments. The three-dimensional representation may then be used as the basis of a design of a dental product, to be manufactured locally as discussed below.

The imaging device 102 includes, for example, image data 103. The imaging device may be any imaging device capable of capturing, storing, compiling, and organizing visual data, e.g., the image data 103, and receiving and sending that data to and from other computing devices, such as the computing device 104, and/or the display device 106. In an exemplary embodiment, the imaging device 102 may be a dental imaging device such as an intra-oral scanning device. For example, the imaging device 102 may be a TRIOS or Lab dental scanner by 3Shape A/S, or any other intro-oral scanner as disclosed in WO 2002/16867 "Method and Apparatus for Three-Dimensional Optical Scanning of Interior Surfaces" filed on 24 Aug. 2001, WO 2010/048960 A1 "Scanner with Feedback Control" filed on 28 Oct. 2009, WO 2010/145669 "Focus Scanning Apparatus" filed on 17 Jun. 2010, WO 2012/083967 A1 "Optical System in 3D Focus Scanner" filed on 21 Dec. 2011, WO 2012/168322 "Dual-resolution 3D Scanner" filed on 6 Jun. 2012, WO 2013/010910 "Detection of a Movable Object when 3D Scanning a Rigid Object" filed on 12 Jul. 2012, WO 2013/132091 "3D Scanner with Steam Autoclavable Tip containing a Heated Optical Element" filed on 9 Mar. 2013, WO 2014/000745 "3D Intraoral Scanner measuring Fluorescence" filed on 27 Jun. 2013, WO 2014/125037 "Focus Scanning Apparatus Recording Color" filed on 13 Feb. 2014, WO 2018/172257 "3D Scanner System with Handheld Scanner" filed on 19 Mar. 2018, WO 2020/148041 "Wireless Scanning Device" filed on 13 Dec. 2019, U.S. Pat. No 11,076,146 "Focus Scanning Apparatus" filed on 19 Mar. 2021, which are incorporated herein by reference in their entirety.

The image data 103 may be any visual data such as, but not limited to, initial scan patches and subsequent new scan patches of an object being imaged by the imaging device 102, e.g. the object 101. In an exemplary embodiment, the imaging device 102 is a dental imaging device as discussed above and the image data 103 includes depth data of the object being scanned. For example, the image data 103 may be 2.5-dimensional image data, e.g., contain depth and color data, or three-dimensional image data of the dental object, e.g. the object 101.

The computing device 104 includes, for example, a processor 110, a memory 120, a storage 130, and a three-dimensional object representation program 140. The device 104 may be a desktop computer, a notebook, a laptop computer, a tablet computer, a handheld device, a smartphone, a thin client, or any other electronic device or computing system capable of storing, compiling, and organizing audio, visual, or textual data and receiving and sending that data to and from other computing devices, such as the imaging device 102, and/or the display device 240. For example, the computer system 600 illustrated in FIG. 6 and discussed in more detail below may be a suitable configuration of the computing device 104.

The processor 110 may include a graphics processing unit (GPU) 112. The processor 104 may be a special purpose or general purpose processor device specifically configured to perform the functions discussed herein. The processor 110 unit or device as discussed herein may be a single processor, a plurality of processors, or combinations thereof. Processor devices may have one or more processor "cores." In an exemplary embodiment, the processor 110 is configured to perform the functions associated with the modules of the three-dimensional object representation program 140 as discussed below. The GPU 112 may be specially configured to perform the functions of the three-dimensional object representation program 140 discussed herein. For example, in exemplary embodiments, the GPU 112 is configured to generate the three-dimensional object representations such as, but not limited to, the three-dimensional object representations 134.

The memory 120 can be a random access memory, read-only memory, or any other known memory configurations. Further, the memory 120 can include one or more additional memories including the storage 130 in some embodiments. The memory 120 and the one or more additional memories can be read from and/or written to in a well-known manner. In an embodiment, the memory and the one or more additional memories can be non-transitory computer readable recording media. Memory semiconductors (e.g., DRAMs, etc.) can be means for providing software to the computing device such as the three-dimensional object representation program 140. Computer programs, e.g., computer control logic, can be stored in the memory 120.

The storage 130 can include, for example, image data 103, and three-dimensional object representations 134. The storage 130 can be deployed on one or more nodes, e.g., storage or memory nodes, or one or more processing-capable nodes such as a server computer, desktop computer, notebook computer, laptop computer, tablet computer, handheld device, smart-phone, thin client, or any other electronic device or computing system capable of storing, compiling, and/or processing data and computer instructions (e.g., image data 103, and three-dimensional object representations 134), and receiving and sending that data to and from other devices, such as the imaging device 102, and/or the display device 106. The storage 130 can be any suitable storage configuration, such as, but not limited to, a relational database, a structured query language (SQL) database, a distributed database, or an object database, etc. Suitable configurations and storage types will be apparent to persons having skill in the relevant art.

The three-dimensional object representations 134 can include a digital master three-dimensional representation 134*a*, a digital registration three-dimensional representation 134*b*, a digital visualization three-dimensional representation 134*c*, and a digital space exclusion representation 134*d*. A digital space exclusion three-dimensional representation is further described in WO 2013/010910 A1 filed on 12 Jul. 2012 by the same applicant, and is herein incorporated by reference in its entirety. The digital master three-dimensional representation 134*a* and the digital visualization three-dimensional representation 134*c* may be, for example, but not limited to a point cloud model, a signed distance model, a triangulated point cloud model, a collection of point clouds optionally with additional information such as uncertainty estimates or color(s), a collection of triangulated point clouds (aka scan patches), a volumetric representation such as a voxel model, a parametrized surface, a surface elements model, or any other suitable three-dimensional representational model. The digital master three-dimensional representation 134*a* may be a three-dimensional model based on all image data 103 received from the imaging device 102. The digital registration three-dimensional representation 134*b* may be a three-dimensional model used to register, e.g., add any new scan patches, received from the imaging device 102, which are then subsequently added to the other digital three-dimensional representations 134. The digital three-dimensional visualization representation 136*c* may be a three-dimensional model of the object 101 that is output to the display device 106 to be viewed by a user of the three-dimensional object representation program 140. The digital space exclusion representation 134*d* may be a three-dimensional model used to calibrate the image data 103 received from the imaging device 102. The three-dimensional object representations 134 are discussed in more detail below with reference to FIGS. 2A, 2B, and 3. In general, a three-dimensional representation is understood herein to either constitute or comprise one or more of the following: a point cloud, a point cloud with additional attributes such as point normals or point colors, a triangulated point cloud (a triangle mesh), a polygonal mesh, a volumetric representation/voxel model, parametric representations e.g. a spline representation.

The three-dimensional object representation program 140 is a software component that utilizes the image data 103 received from the imaging device 102 and/or stored in the storage 130 to generate the three-dimensional object representations 134 and then outputs a three-dimensional visualization output 162, e.g. the three-dimensional visualization representation 134*c*. In an exemplary embodiment, the three-dimensional object representation program 140 includes an image data receipt module 142, a three-dimensional representation generation module 144, a three-dimensional representation update module 146, a key frame selection module 148, a re-registration module 150, a space exclusion module 152, and a display module 154. The three-dimensional object representation program 140 is a software component specifically programmed to implement the methods and functions disclosed herein for generating a digital three-dimensional representation of a dental object during scanning with a dental imaging device. The three-dimensional object representation program 140 and the modules 144-154 are discussed in more detail below with reference to FIGS. 2A, 2B, 3, 4A, and 4B.

The three-dimensional object representation program 140 can include a graphical user interface 160. The graphical user interface 160 can include components used to receive input from the imaging device 102, the computing device 104, and/or the display device 106 and transmit the input to the three-dimensional object representation program 140 or conversely to receive information from the three-dimensional object representation program 140 and display the information on the computing device 104, and/or the display device 106. In an example embodiment, the graphical user interface 160 uses a combination of technologies and devices, such as device drivers, to provide a platform to enable users of the computing device 104, and/or the display device 106 to interact with the three-dimensional object representation program 140. In the example embodiment, the graphical user interface 160 receives input from a physical input device, such as a keyboard, mouse, touchpad, touchscreen, camera, microphone, etc. In an exemplary embodiment, the graphical user interface 160 may display a three-dimensional visualization representation output 162. While the graphical user interface 160 is illustrated as part of the display device 106, it can be appreciated that the graphical user interface 160 is a part of the three-dimensional object representation program 140 and may be a part of the computing device 104, and/or the display device 106.

While the processor 110, the memory 120, the storage 130, and the three-dimensional object representation program 140 are illustrated as part of the computing device 104, it can be appreciated that each of these elements or a combination thereof can be a part of a separate computing device.

The display device 106 can include the graphical user interface 160. The display device 106 be any computing device, such as, but not limited to, a cell phone, a server computer, a desktop computer, a notebook, a laptop computer, a tablet computer, a handheld device, a smart-phone, a thin client, or any other electronic device or computing system capable of receiving display signals from another computing device, such as the imaging device 102, and/or the computing device 104, etc. and outputting those display signals to a display unit such as, but not limited to, an LCD screen, plasma screen, LED screen, DLP screen, CRT screen, etc. For example, the graphical user interface 160 may receive the three-dimensional visualization representation output 162 from the three-dimensional object representation program 140 and display the three-dimensional visualization representation output 162 on the display device 106. Further, the graphical user interface 160 may receive data input files, e.g., the image data 103, from a user and transmit those data input files, e.g., the image data 103, to the three-dimensional object representation program 140. The data input files e.g., the image data 103, can include a single piece of data (e.g., a single scan patch from the imaging device 102) or multiple pieces of data (e.g., a plurality of scan patches from the imaging device 102). The display device 106 may communicate with the imaging device 102, and/or the computing device 104 via a hard-wired connection or via the network 108. For example, the display device 106 may have a hard-wired connection to the image device such as, but not limited to, a USB connection, an HDMI connection, a display port connection, a VGA connection, or any other known hard-wired connection capable of transmitting and/or receiving data between the imaging device 102, the computing device 104, and/or the display device 106.

While the display device 106 is illustrated as being separate from the imaging device 102, and the computing device 104, it can be appreciated that the display device 106 can be a part of the imaging device 102, and/or the computing device 104. For example, the computer system 600 illustrated in FIG. 6 and discussed in more detail below may be a suitable configuration of the imaging device 102, the computing device 104, and/or the display device 106.

The optional network 108 may be any network suitable for performing the functions as disclosed herein and may include a local area network (LAN), a wide area network (WAN), a wireless network (e.g., WiFi), a personal area network (PAN) (e.g. Bluetooth), a near-field communication (NFC) network, a mobile communication network, a satellite network, the Internet, fiber optic, coaxial cable, other hardwired networks, infrared, radio frequency (RF), or any combination of the foregoing. Other suitable network types and configurations will be apparent to persons having skill in the relevant art. In general, the network 108 can be any combination of connections and protocols that will support communications between the imaging device 102, the computing device 104, and/or the display device 106. In some embodiments, the network 108 may be optional based on the configuration of the imaging device 102, the computing device 104, and the display device 106.

Example Process for Local Manufacturing of Dental Products

Figure 2:
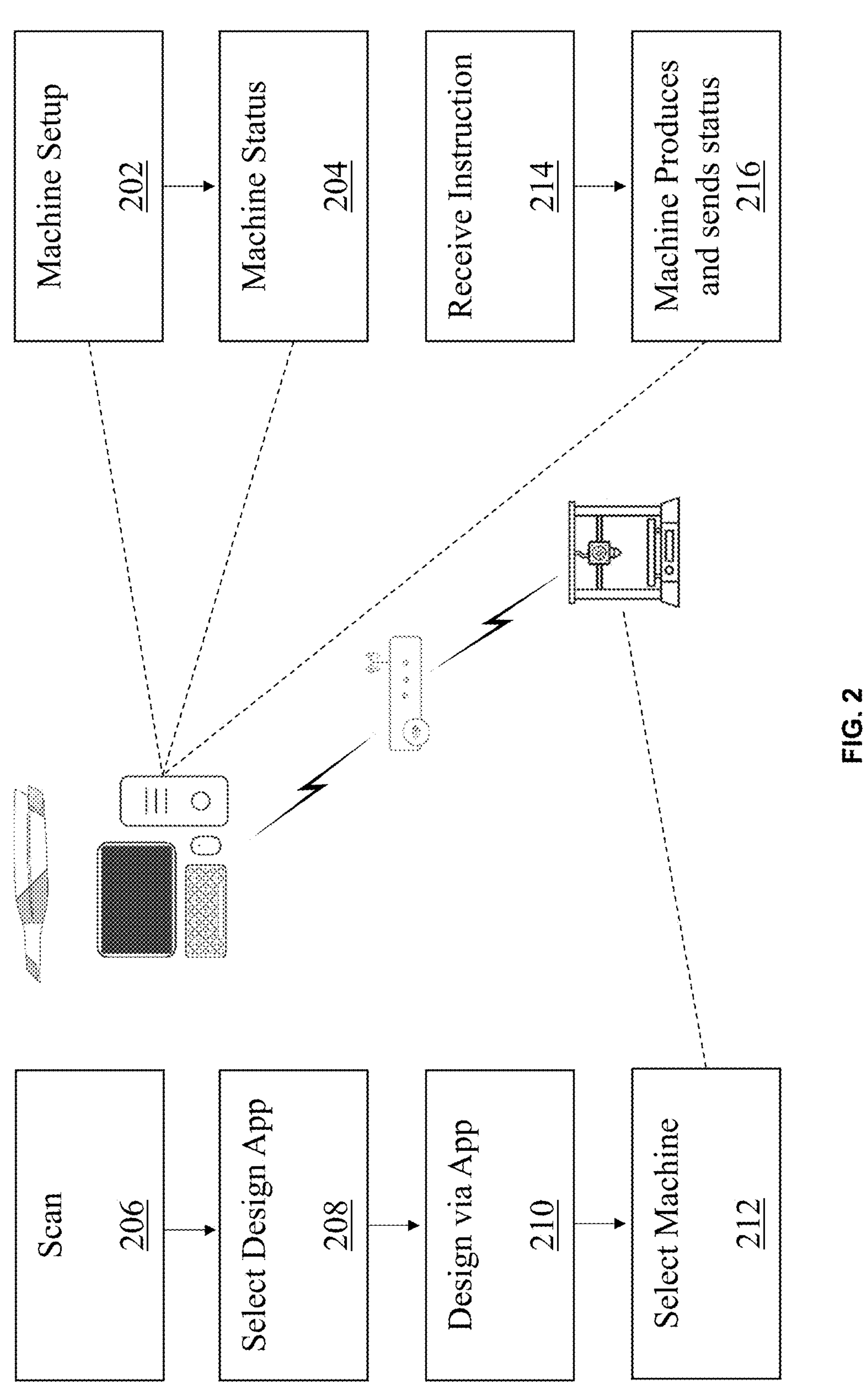
FIG. 2 illustrates steps taken between the clinical computing device and a manufacturing machine, such as a milling machine or 3D printer, that is in the clinical setting, in accordance with some embodiments of the invention.

FIG. 2 illustrates a process for local manufacturing of dental products. Local manufacturing allows for rapid help to the patient, easy adjustments to existing dental products, reduced cost, and other benefits. A clinical computer will interact with a manufacturing machine that is local to the clinical computer, over a computer network. A manufacturing machine may include a milling machine, a 3D printer, or other type of manufacturing machine. This interaction allows any of numerous clinical computers on a computer network to use the manufacturing machine. It also allows for a single clinical computer to interact with any of numerous different manufacturing machines, based upon the needs of the dental product to be produced.

The interaction between the clinical computer and the manufacturing machine may be considered to be three phases: a connection check phase, a data transfer phase, and a manufacturing feedback phase. The connection check phase happens when a user enters the module, such as via a desktop application. To receive the availability status for all available integration components, the system initiates connection to every component and calls 'Connect' method. A successful call implies that the integration component is ready to receive manufacturing jobs. The data transfer phase starts when a user selects a particular manufacturing machine to produce specified items, and it finishes when the integration component receives all the necessary data. The phase may consists of two calls: 'GetNeededData' is used to query what data integration component needs to produce the given items, and 'StartJob' is used to initiate the manufacturing job. Finishing this call from the manufacturing machine side implies that the manufacturing machine has received all the data and started (or at least allocated) the jobs. The response should contain the job identifiers to track manufacturing status in the next phase. The manufacturing feedback phase starts after a job is sent for production and finishes when a manufacturing job reaches a final state.

In Step 202, a manufacturing machine is setup for usage by a clinical computer. This may use a protocol that allows for communication between the clinical computer and the manufacturing machine. The protocol may be, or may include, a gRPC (Remote Procedure Calls) framework that supports client-server communication as soon as their protocol definitions are compatible, they do not need to match exactly. However, certain changes in the protocol definition are treated as incompatible and might prevent any communication between server and client. To address potential backward/forward compatibility scenarios, the protocol may be in two or more layers.

First, an introductory handshake layer allows determining major versions of the protocol supported by the server (such as a gRPC framework). This communication layer may be designed to be very primitive and unchanged over time. A protocol module (potentially supporting multiple versions of the protocol) will run this handshake first to figure out the highest version of protocol supported both by partner integration component (e.g., the manufacturing machine) and the clinical computer. If there is no protocol version supported both by the manufacturing machine software and the clinical computer software, the protocol may abort the connection.

Second, a version-specific layer allows detailed communication between the protocol and the manufacturing machine. Within a single major version client and server establish a connection and support at least some level of communication. However, it is still possible that some data will be missing if the clinical computer and the manufacturing machine have minor changes in protocol definition.

Figure 3A:
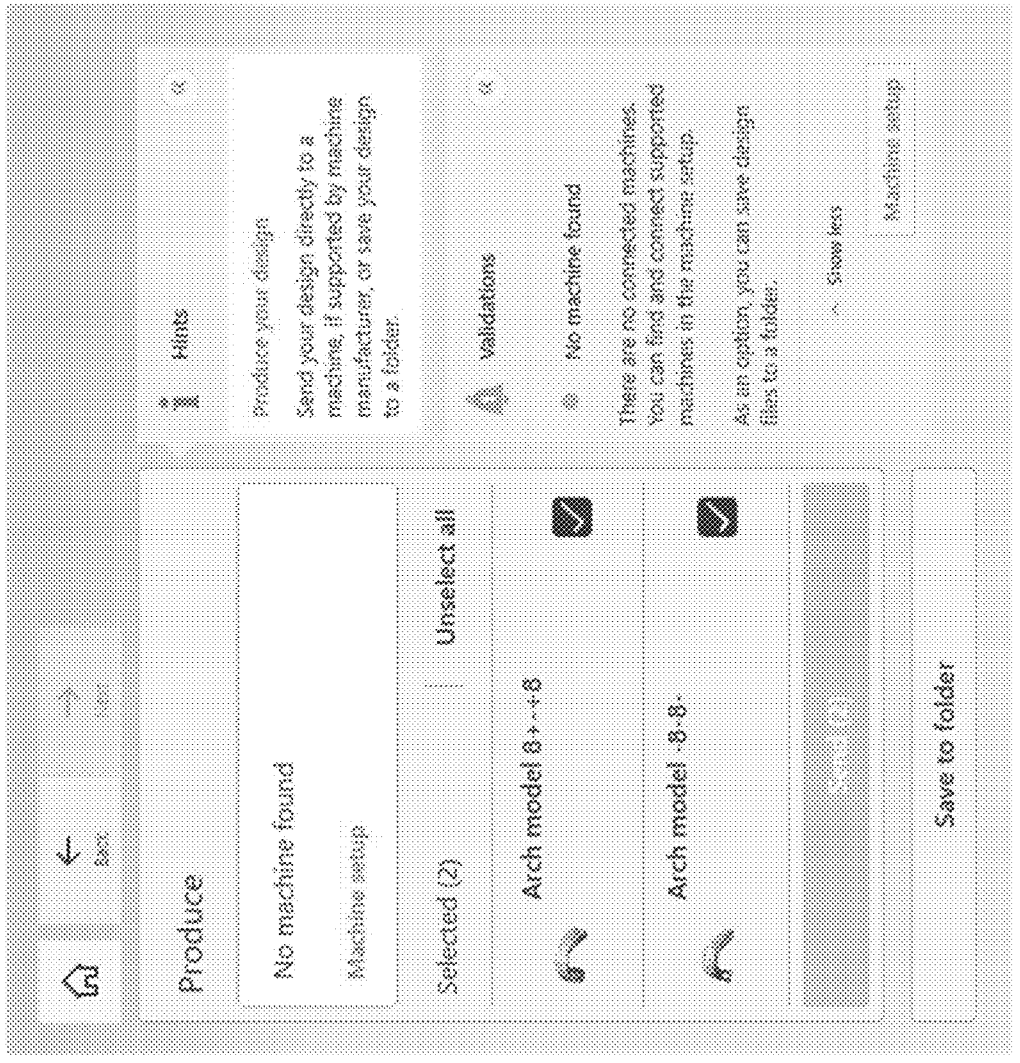
FIG. 3A is an example graphical user interface showing a setup screen shown on the clinical computing device for connecting to the manufacturing machine, in accordance with some embodiments of the invention.
Figure 3B:
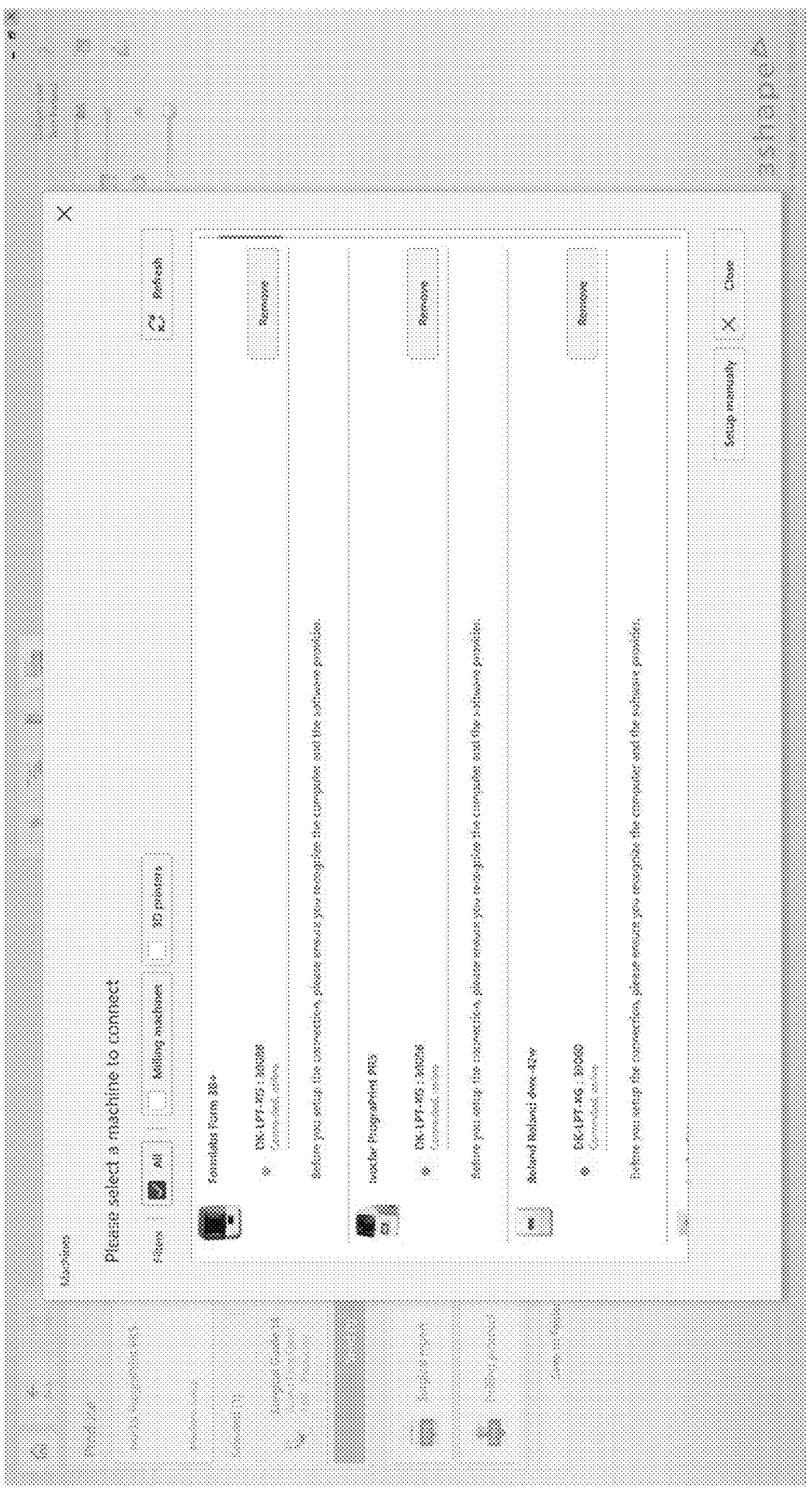
FIG. 3B is an example graphical user interface of a manufacturing machine selection screen shown on the clinical computing device for selecting a local manufacturing machine for production, in accordance with some embodiments of the invention.

As an example functionality, accessing the system for the first time, hints and/or notification systems may alert and/or remind the user to setup the manufacturing machine. The user may select Machine Setup under a "No machine found" message or from validations pop-up (such as shown in FIG. 3A). After opening Machine setup, the user may view any/all integrated machines communicatively coupled with the clinical computer. In the descriptions of the machines, the user may be shown a link to manufacturing software. The user can then click and follow the link to connect to the selected manufacturing machine.

In Step 204, the manufacturing machine sends a status to the clinical computer via the protocol. This allows the clinical computer to know which manufacturing machines are prepared to complete the project and allows for the user to diagnose and solve problems.

An example color system for a status may be used. In this example, green may indicate that the machine is set up and available in the network. Orange may indicate that the machine is set up, but not available in the network. This may be due to the machine being turned off, being involved in another manufacturing operation, or other problems making the manufacturing machine not immediately available. Grey may indicate that a machine is not set up. In that case the user should check that the manufacturing software is installed and running.

The user can connect more than one machine. The user can change between machines and see their status, such as by pressing Change machine. By knowing the status of the machine, the user may select which of two or more manufacturing machines to use for a certain project, so long as the manufacturing machine can perform the needed task.

Figure 1B:
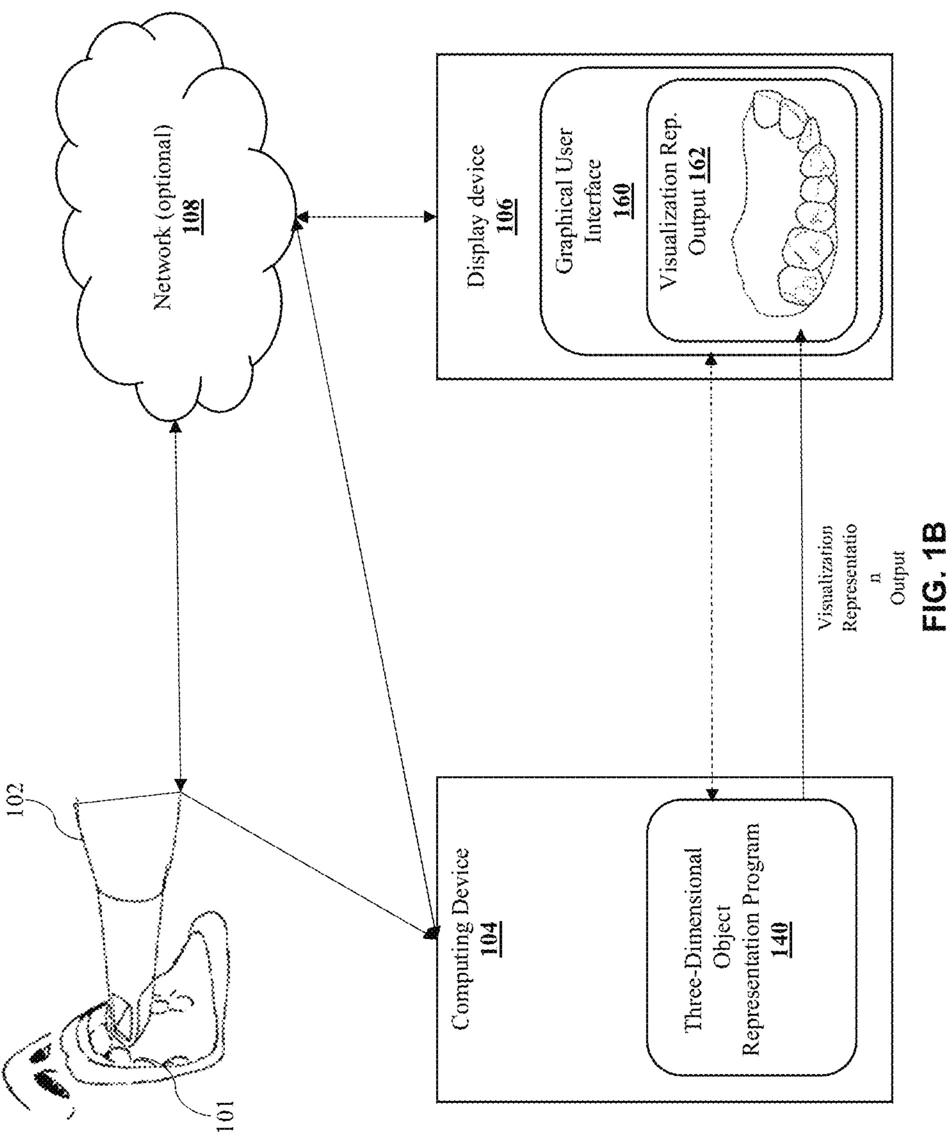
FIG. 1B illustrates an intraoral scanner that may be used in conjunction with a clinical computing device and a display device in accordance with some embodiments of the invention.

In Step 206, a scan of the patient's teeth is performed, such as described above in FIGS. 1A and 1B. After the scan, a 3D model of the patient's dentition is produced. The 3D model may be used to diagnose a dental condition of the patient (either manually by the clinician, automatically by the clinical computer, or some combination thereof).

In Step 208, a user selects an application from the clinical computer for use in designing the dental product. The application may be a Studio App or Model Maker. The application may be local to the clinical computer, based in a cloud, accessed through a website, etc. Any of various design applications may be used.

Figure 4:
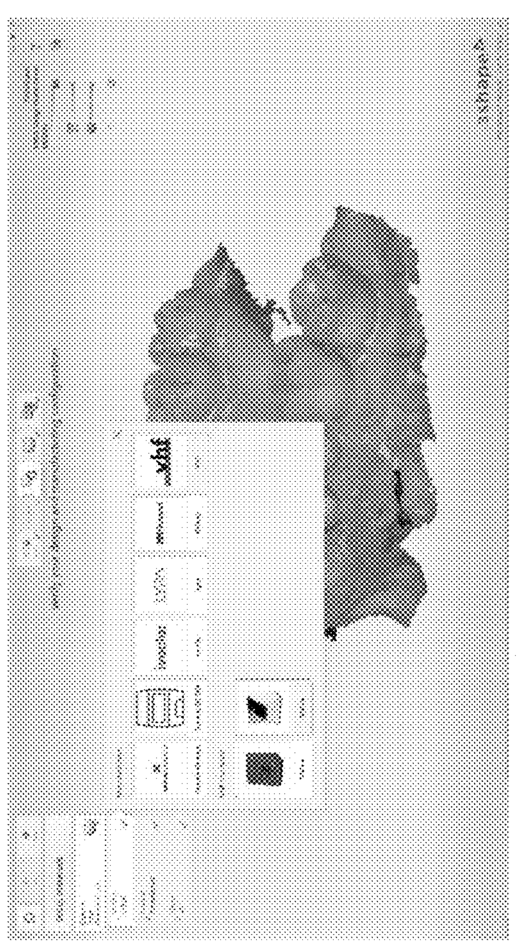
FIG. 4 includes four example graphical user interfaces which may be used to design a dental product, in accordance with some embodiments of the invention.
Figure 4:
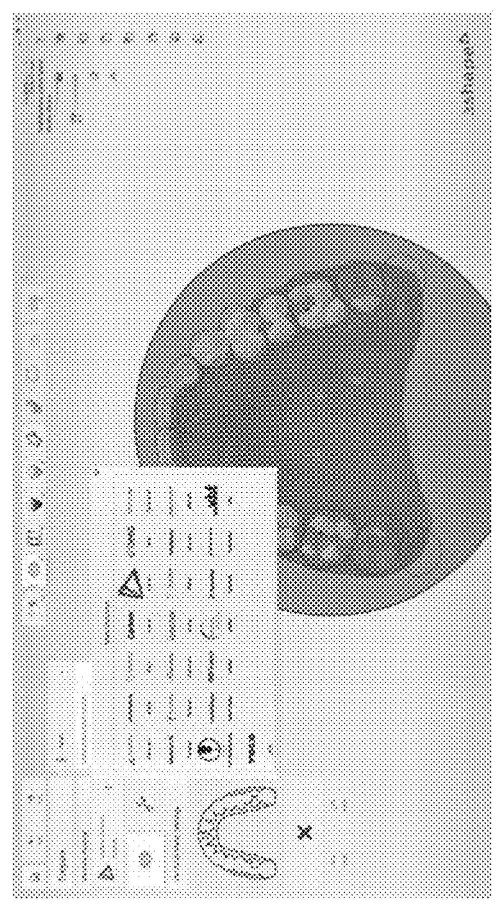
Figure 4:
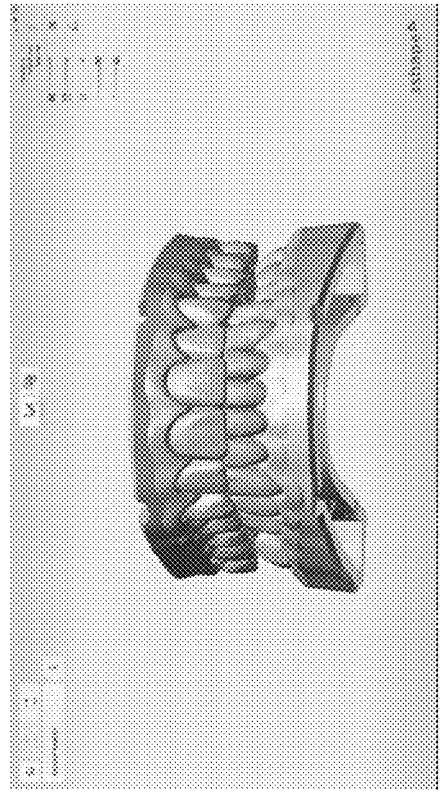
Figure 4:
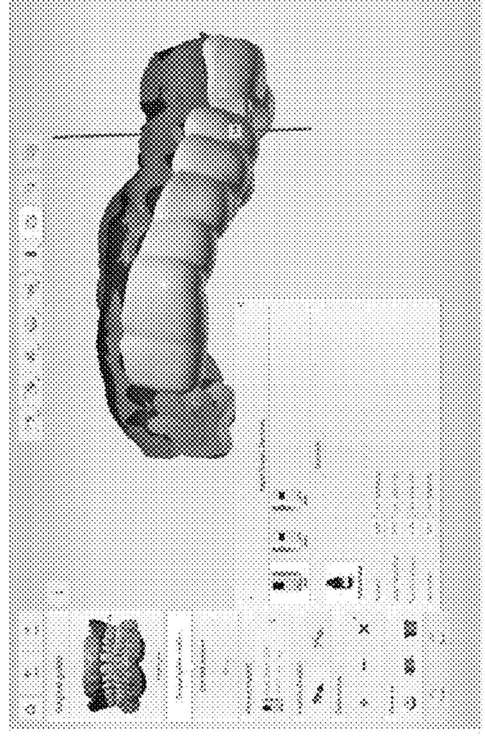

A first example application is Model Maker (such as shown in the top left of FIG. 4). Once the model is created, a user can proceed to printing by pressing Next and going to the last step in the workflow.

A second example application is a Design Studio (such as shown in the top right of FIG. 4). In a setup materials step, a user selects the Manufacturer, Machine, and Material they would like to use. The software will remember your selection next time you enter the step. The user can make changes, simply by clicking the machine and/or material tab to open the selection panel. The user can then proceed with design and once completed, press Next and continue.

A third example application is Implant Studio (such as shown in the lower left of FIG. 4). After designing a surgical guide in Surgical Guide step, the user can select the Manufacturer, Machine, and Material they would like to use for production. The user can then proceed with design and once completed, press Next and continue to manufacturing.

A fourth example application is Splint Studio. In a Prepare step, the user can select Manufacturer, Machine and Material to use for production. The software will remember the selection next time the user enters the step. Changes can be made by simply clicking the machine and/or material tab to open the selection panel. The user can proceed with design and once completed, press Next and continue to 3Shape Produce.

In Step 210, the user begins designing a dental product via the application. This may be performed in numerous different ways based upon the application and the dental product involved. In some embodiments, a machine learning algorithm may be employed to automatically design the dental component based on input from the user. For example, the user may indicate in an order form that a crown should be designed for a specific tooth, and the machine learning algorithm may then automatically design the crown to be manufactured.

Figure 5A:
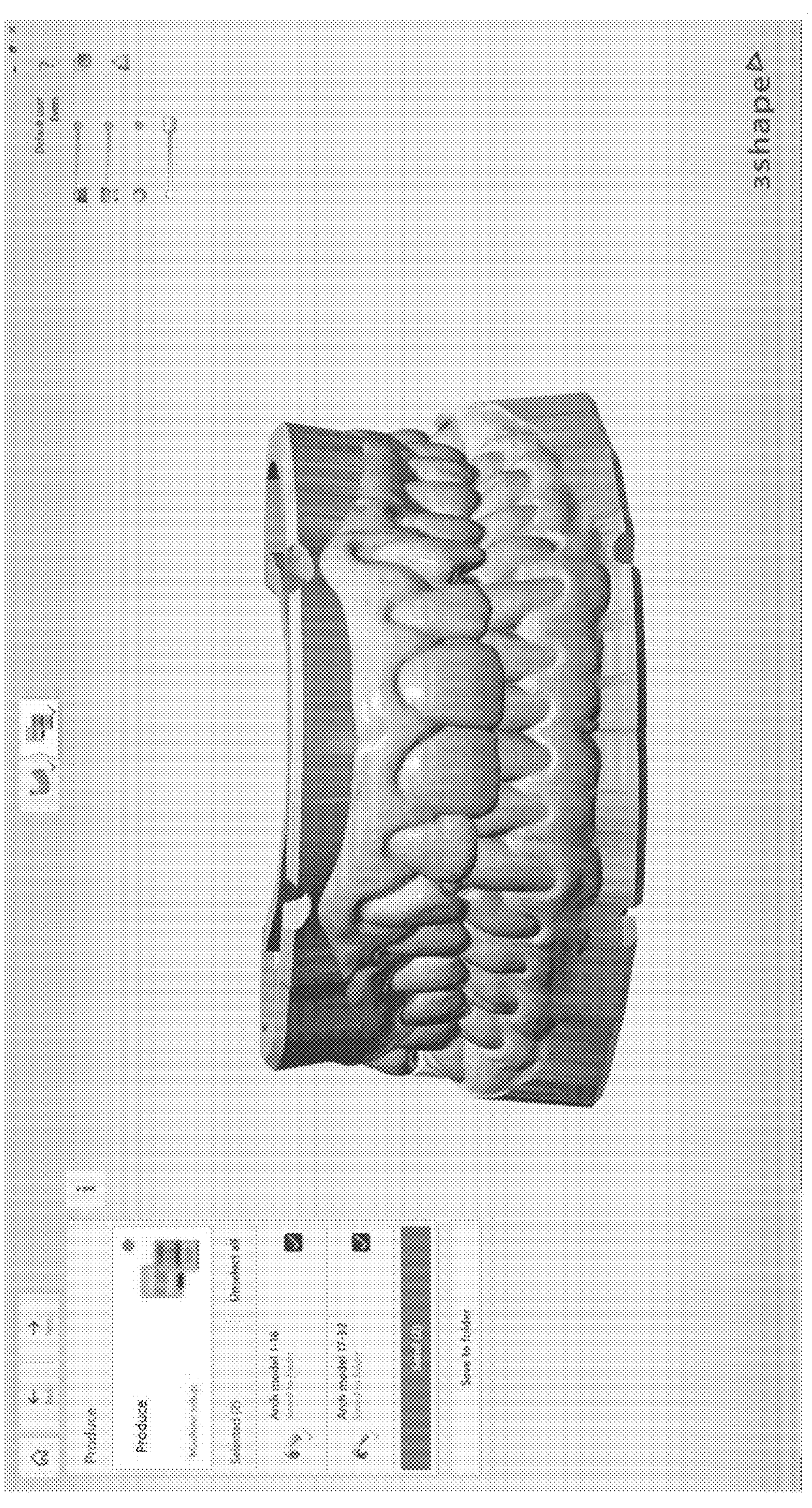
FIG. 5A is an example graphical user interface showing an option to send a completed design to a manufacturing machine, in accordance with some embodiments of the invention.

FIG. 5A shows an example screenshot displayed to the user while designing the dental product, As can be seen on the left side, an option to manufacture the dental product by sending the job to an associated manufacturing machine.

Figure 5B:
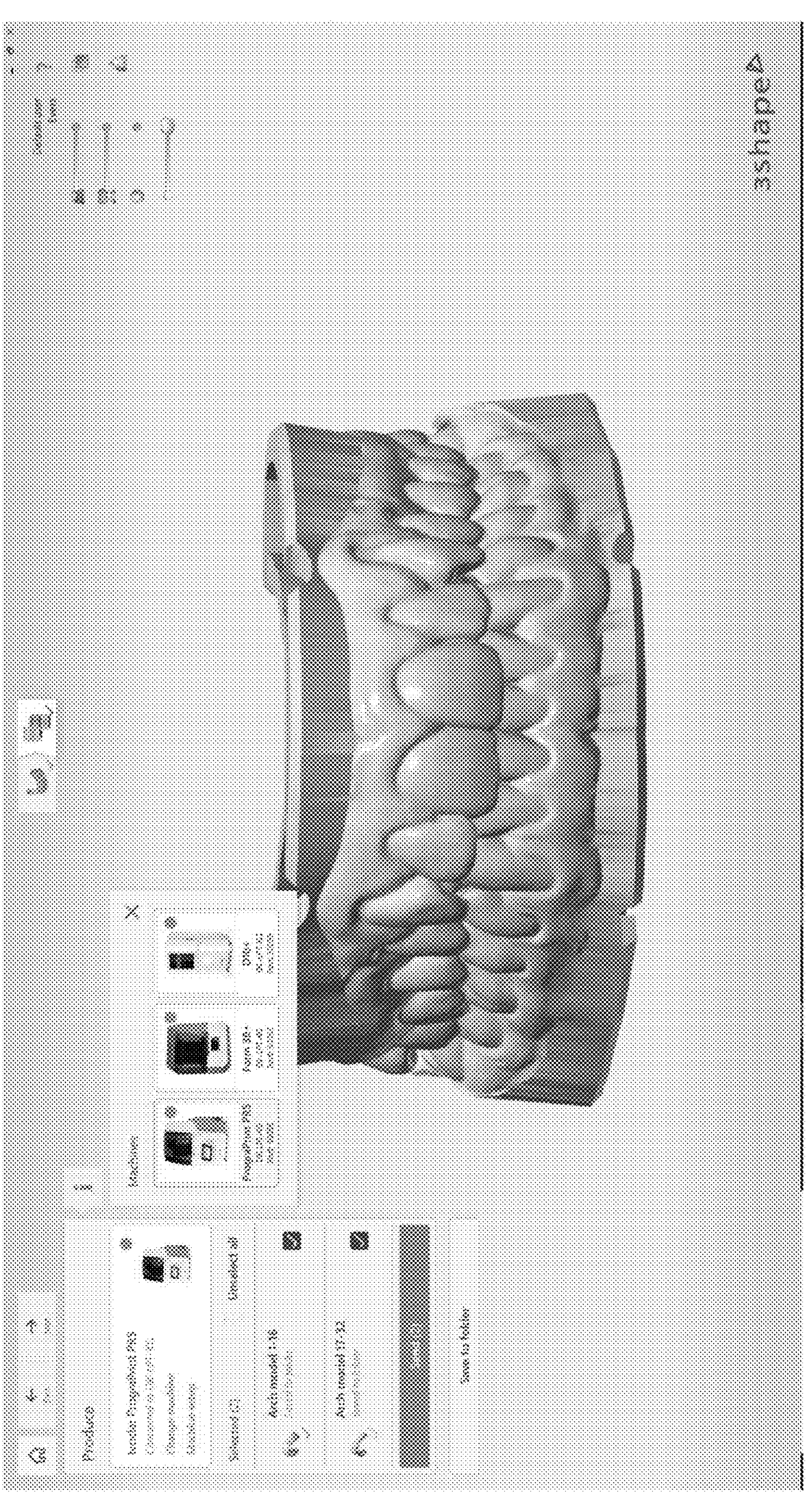
FIG. 5B is an example graphical user interface showing an option to select a certain manufacturing machine, in accordance with some embodiments of the invention.

In Step 212, the manufacturing machine is selected. In some embodiments, the user selects a manufacturing machine for usage via the protocol. For other embodiments, a machine selected during the design phase will be suggested to the user. As shown in FIG. 5B, the user may be presented with the status of the various manufacturing machines via status messages sent through the protocol. One manufacturing machine may be selected by default, with other manufacturing machines also available for selection. In some embodiments, the system may recommend a certain manufacturing machine based upon various criteria (the design, the materials of the manufacturing machine, the precision of the manufacturing machine, the status of the manufacturing machine, and the like).

In Step 214, the manufacturing machine receives instructions, which may include the 3D model and/or the design plan created via the application. These instructions are sent via the protocol and enable the manufacturing machine to understand and use the instructions. The protocol may include a standardized format for one or more components of the instructions.

In Step 216, the manufacturing machine produces and sends status messages to the clinical computer. The status messages, sent over the protocol, provide updates to the clinical computer. 'GetPartnerComponentJobStatus' is used to get the statuses of a specific job which is in production. The connection can be closed by the clinical computer (for example, if the user is not interested in job status updates anymore or is leaving the case) or by server (for example, upon reaching a final state, such as JobFinishedSuccessfully' or 'JobCancelled').

In some embodiments, instead of sending the design directly to an integrated milling machine or 3D printer, the user can choose to export the design using a "save to folder" option. The data format of the design file may be in any suitable format, such as proprietary formats like the 3Shape DCM format, or industry standard formats such as STL. Saving the designs to a folder offers several advantages, including allowing the user to save multiple designs for simultaneous manufacture at a later point in time. Saving to folder also gives the user the possibility to send the designs for manufacturing at a remote facility, such as a dental laboratory. This may be advantageous for example in cases where any manufacturing machines on site at the dental clinic are offline, not suitable for manufacturing the design, or the dental clinic does not have any manufacturing machines on site.

Computer System Architecture

Figure 6:
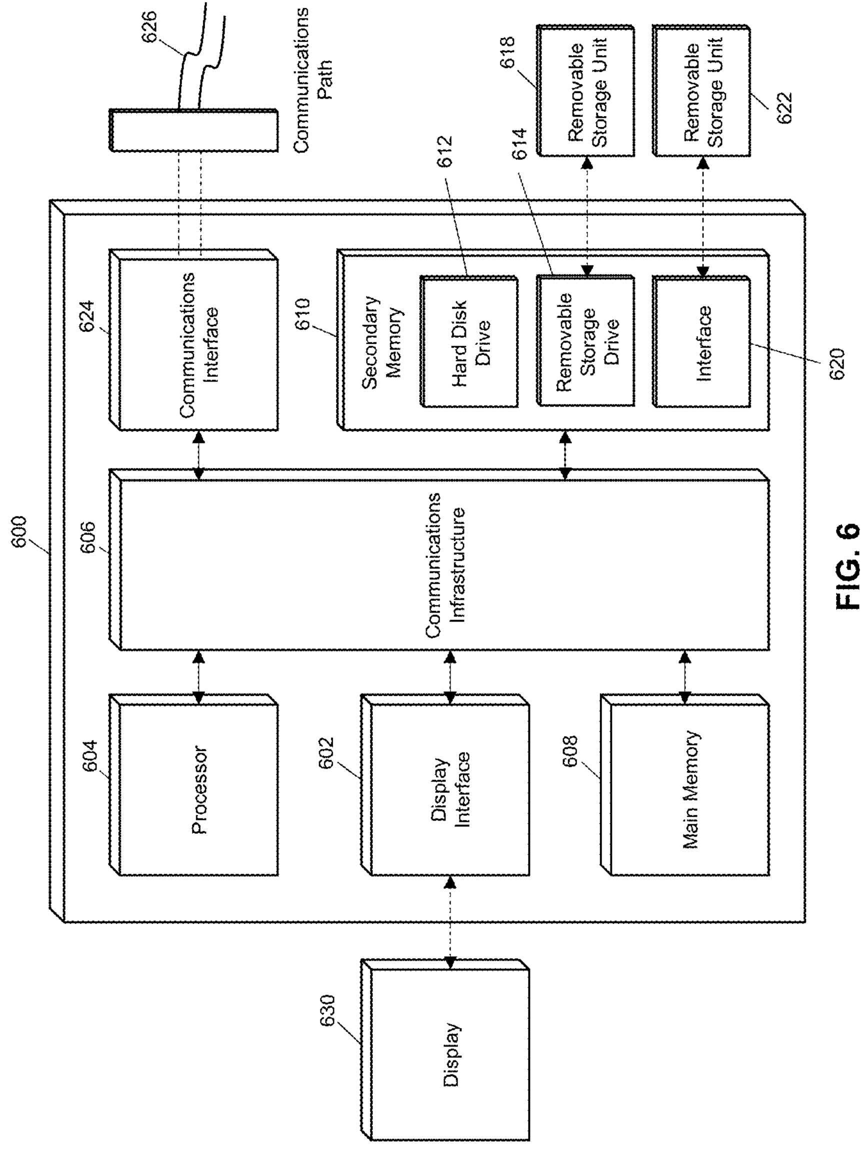
FIG. 6 is a hardware diagram showing computing components of a clinical computer or other computer, in accordance with some embodiments of the invention.

FIG. 6 illustrates a computer system 600 in which embodiments of the present disclosure, or portions thereof, may be implemented as computer-readable code. For example, the imaging device 102, the computing device 104, and/or the display device 106 of FIG. 1A may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 1A-4B If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 410. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the processes and methods as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for generating a digital three-dimensional representation of a dental object during scanning with a dental imaging device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. Although operations can be described as a sequential process, some of the operations can in fact be performed in parallel, concurrently, and/or in a distributed environment, and with program code stored locally or remotely for access by single or multiprocessor machines. In addition, in some embodiments the order of operations can be rearranged without departing from the spirit of the disclosed subject matter. It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced.

The invention claimed is:

1. A method for manufacturing a dental component in a dental clinic or laboratory, the method comprising:

setting up one or more manufacturing machines for usage by a clinical computer over a computer network wherein the one or more manufacturing machines and the clinical computer are in the dental clinic or laboratory;

designing, in a design software application on the clinical computer, the dental component to be manufactured wherein the designing is performed using a machine learning algorithm and wherein the dental component is a crown, inlay, onlay, veneer, bridge, removable partial denture, full denture, occlusal splint or surgical guide;

suggesting, by the design software application, a manufacturing machine for manufacturing the dental component based on one or more of the following criteria: the design of the dental component, the materials available for use in each of the one or more manufacturing machines, or the precision of the one or more manufacturing machines;

receiving, on the clinical computer, a status message from each of the one or more manufacturing machines indicating a status of the manufacturing machine;

responsive to the status message from each of the one or more manufacturing machines, selecting a manufacturing machine from the one of the one or more manufacturing machines for manufacturing the dental component; and sending the designed dental component from the clinical computer to the selected manufacturing machine over the computer network.

2. The method according to claim 1 further comprising the step of manufacturing the designed dental component on the selected manufacturing machine.

3. The method according to claim 1, wherein setting up the one or more manufacturing machines comprises:

using a two layer communication protocol to connect the clinical computer to the one or more manufacturing machines, wherein the communication protocol comprises:

an introductory handshake layer which determines major versions of the two layer communication protocol supported by a server; and a version-specific layer which allows detailed communication between the two layer communication protocol and the one or more manufacturing machines.

4. The method according to claim 3, wherein the two layer communication protocol comprises a gRPC framework.

5. A system for manufacturing a dental component in a dental clinic or laboratory, the system comprising:

one or more manufacturing machines configured to manufacture the dental component; and a clinical computing device communicatively coupled to the one or more manufacturing machines over a computer network wherein the one or more manufacturing machines and the clinical computing device are in the dental clinic or laboratory, wherein the clinical computing device is configured to:

design, in a design software application on the clinical computer, the dental component to be manufactured wherein the designing is performed using a machine learning algorithm and wherein the dental component is a crown, inlay, onlay, veneer, bridge, removable partial denture, full denture, occlusal splint or surgical guide;

suggest, by the design software application, a manufacturing machine for manufacturing the dental component based on one or more of the following criteria: the design of the dental component, the materials available for use in each of the one or more manufacturing machines, or the precision of the one or more manufacturing machines;

receive a status message from each of the one or more manufacturing machines indicative of a status of the one or more manufacturing machines;

receive a selection of a manufacturing machine for a dental design completed via an application of the clinical computing device;

display, in the application, an indication of the status messages;

send, from the application, instructions to the selected manufacturing machine indicative of the dental design;

receive a manufacturing status message indicative of the progress of the manufacturing of the dental component; and display, in the application, an indication of the manufacturing status message.

6. The system according to claim 5, wherein the one or more manufacturing machines is a dental milling machine or a 3D-printer suitable for printing the dental component.

7. A method of manufacturing a dental component in a dental clinic, the method comprising:

scanning a patient's oral cavity using an intra-oral scanner;

sending the intra-oral scan data to from the intra-oral scanner to a clinical computing device, the intra-oral scanner communicatively coupled to the clinical computing device over a computer network;

creating a digital three-dimensional representation of the patient's teeth using at least the intra-oral scan data;

setting up one or more manufacturing machines for usage by a clinical computer over the computer network, wherein the one or more manufacturing machines and the clinical computing device are in the dental clinic;

designing, in a design software application on the clinical computer, the dental component to be manufactured, wherein the designing is performed using a machine learning algorithm and wherein the dental component is a crown, inlay, onlay, veneer, bridge, removable partial denture, full denture, occlusal splint or surgical guide;

receiving, on the clinical computer, a status message from the one or more manufacturing machines indicating a status of the one or more manufacturing machines;

responsive to the status message, selecting a manufacturing machine for manufacturing the dental component based on one or more of the following criteria: the design of the dental component, the materials available for use in each of the one or more manufacturing machines, or the precision of the one or more manufacturing machines;

sending the designed dental component from the clinical computer to the selected manufacturing machine over the computer network; and manufacturing the designed dental component on the selected manufacturing machine.

* * * * *